US012776226B2

(12) United States Patent
Visoiu et al.

(10) Patent No.: US 12,776,226 B2
(45) Date of Patent: Oct. 27, 2026

(54) CAUDAL EPIDURAL SIMULATION DEVICE FOR PROCEDURES PERFORMED USING ULTRASOUND GUIDANCE

(71) Applicant: University of Pittsburgh—Of the Commonwealth System of Higher Education, Pittsburgh, PA (US)

(72) Inventors: Mihaela Visoiu, Pittsburgh, PA (US); Brandon J. Barber, Pittsburgh, PA (US); Daniel Arthur Yates, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 236 days.

(21) Appl. No.: 18/698,831

(22) PCT Filed: Oct. 5, 2022

(86) PCT No.: PCT/US2022/045782

§ 371 (c)(1),
(2) Date: Apr. 5, 2024

(87) PCT Pub. No.: WO2023/059720

PCT Pub. Date: Apr. 13, 2023

(65) Prior Publication Data

US 2024/0412664 A1 Dec. 12, 2024

Related U.S. Application Data

(60) Provisional application No. 63/252,689, filed on Oct. 6, 2021.

(51) Int. Cl.
*G09B 23/28* (2006.01)
*G09B 23/30* (2006.01)

(52) U.S. Cl.
CPC ......... *G09B 23/285* (2013.01); *G09B 23/286* (2013.01); *G09B 23/303* (2013.01)

(58) Field of Classification Search
CPC .... G09B 23/285; G09B 23/286; G09B 23/28; G09B 23/30
See application file for complete search history.

(56) References Cited

U.S. PATENT DOCUMENTS

2017/0106142 A1* 4/2017 Hochman ............. A61M 5/172
2018/0296792 A1* 10/2018 Hochman .............. A61M 5/20

(Continued)

FOREIGN PATENT DOCUMENTS

WO 2016028821 A1 2/2016

OTHER PUBLICATIONS

Aggarwal et al., "Anatomic Consideration of Caudal Epidural Space: A Cadaver Study", Clinical Anatomy, 2009, pp. 730-737, vol. 22(6).

(Continued)

*Primary Examiner* — Eddy Saint-Vil
(74) *Attorney, Agent, or Firm* — The Webb Law Firm

(57) ABSTRACT

A simulation device for an epidural block procedure includes an elongated internal frame formed from an ultrasound opaque material defining an axially extending channel accessible through a widened funnel portion of the internal frame. The simulation device also includes a barrier positioned in the channel representative of anatomical structures that should not be contacted by an epidural needle and a body formed from an ultrasound penetrable material molded about and at least partially enclosing the internal frame configured to be pierced by the epidural needle. The internal frame is positioned so that the epidural needle can be inserted through a surface of the body and into the channel through the funnel portion to simulate insertion of the (Continued)

epidural needle into an epidural space during the epidural block procedure.

19 Claims, 10 Drawing Sheets

(56) References Cited

U.S. PATENT DOCUMENTS

| | | | | |
|---|---|---|---|---|
| 2019/0125470 | A1* | 5/2019 | Moskowitz | A61B 17/3401 |
| 2020/0016373 | A1* | 1/2020 | Hulvershorn | A61B 5/0215 |
| 2021/0386452 | A1* | 12/2021 | Dick | A61B 5/4896 |

OTHER PUBLICATIONS

Bortman et al., "Improving Clinical Proficiency Using a 3-Dimensionally Printed and Patient-Specific Thoracic Spine Model as a Haptic Task Trainer", Regional Anesthesia and Pain Medicine, 2018, pp. 819-824, vol. 43(8).

Mirjalili et al., "Should we abandon landmark-based technique for caudal anesthesia in neonates and infants?", Pediatric Anesthesia, 2015, pp. 511-516, vol. 25(5).

Ponde et al., "Does ultrasound guidance add accuracy to continuous caudal-epidural catheter placements in neonates and infants?", Pediatric Anesthesia, 2017, pp. 1010-1014, vol. 27(10).

Schloss et al., "Caudal epidural blockade for major orthopedic hip surgery in adolescents", Saudi Journal of Anesthesia, 2015, pp. 128-131, vol. 9(2).

Sisay et al., "Inadvertent life-threatening total spinal anesthesia following caudal block in a preschool child underwent urologic surgery: A rare case report", International Journal of Surgery Case Reports, 2021, vol. 88: 106541.

Suresh et al., "., Are caudal blocks for pain control safe in children? An analysis of 18,650 caudal blocks from the Pediatric Regional Anesthesia Network (PRAN) database", Anesthesia and Analgesia, 2015, pp. 151-156, vol. 120(1).

Taenzer et al., "Experience with 724 epidurograms for epidural catheter placement in pediatric anesthesia", Regional Anesthesia and Pain Medicine, 2010, pp. 432-435, vol. 35(5).

* cited by examiner

CAUDAL EPIDURAL SIMULATION DEVICE FOR PROCEDURES PERFORMED USING ULTRASOUND GUIDANCE

CROSS REFERENCE TO RELATED APPLICATION

This application is the United States national phase of International Patent Application No. PCT/US22/45782, filed Oct. 5, 2022, and claims priority to United States Provisional Patent Application No. 63/252,689, filed Oct. 6, 2021, the disclosures of which are hereby incorporated by reference in their entireties.

BACKGROUND OF THE INVENTION

Field of the Invention

The present disclosure is directed to simulation devices, training systems, and training methods that allow a practitioner to practice performing epidural punctures, such as a caudal epidural block with single injection, and catheter placement, with ultrasound visualization and guidance.

Description of Related Art

A caudal epidural block is a widely used pediatric regional technique to provide intraoperative and postoperative analgesia. A single injection caudal block procedure involves placing a needle inside the sacral canal followed by injection of a local anesthetic. A caudal epidural catheter procedure involves placing a catheter inside the needle and advancing the catheter from the caudal level to the sacral, lumbar, or thoracic spine level. After advancing the catheter to a desired position, it can be important to confirm catheter tip location at the desired spinal level.

Generally, caudal blocks have a high success rate, even though the success rate varies depending upon the practitioner's experience, as well as palpable sacrum hiatus anatomy and/or the age of the patient. See Mirjalili S A. Taghavi K, Frawley G, Craw S. *Should we abandon landmark-based technique for caudal anesthesia in neonates and infants? Paediatr Anaesth.* 2015 May 25 (5): 511-6. doi: 10.1111/pan.12576. Epub 2015 Jan. 16. PMID: 25597342. For example, one study has determined that younger patients with a median age (interquartile range) of 11 months developed more complications than older patients (14 months). However, in all cases, complications are generally rare, occurring about 1.9% (1.7%-2.1%) of the time (95% confidence interval). See Suresh, et al., *Are caudal blocks for pain control safe in children? An analysis of* 18,650 *caudal blocks from the Pediatric Regional Anesthesia Network (PRAN) database, Anesth. Analg.* 2015 January: 120 (1): 151-6. PMID 25393589. A common complication is block failure, which occurs when the needle is not correctly inserted into the epidural space. Some studies suggest that these complications can occur as often as 31% of the time when the caudal blocks are performed for adolescent patients. See Schloss B. Martin D. Tripi J, Klingele K, Tobias J D. *Caudal epidural blockade for major orthopedic hip surgery in adolescents. Saudi J Anaesth.* 2015 Apr.-Jun. 9 (2): 128-31. doi: 10.4103/1658-354X.152832. PMID: 25829898; PMCID: PMC4374215.

In some cases, it has been found that anatomical variations of the sacral hiatus and sacral cornua, obesity, and/or excessive subcutaneous fat can make it more difficult for practitioners to identify anatomical landmarks in the sacral region used for determining an injection site. See Aggarwal A. Kaur H. Batra Y K. Aggarwal A K, Rajeev S, Sahni D. *Anatomic consideration of caudal epidural space: a cadaver study. Clin Anat.* 2009 Sep. 22 (6): 730-7. doi: 10.1002/ca.20832. PMID: 19637298. Other landmarks, such as an equilateral triangle for infant caudal anesthesia, can also be unreliable. See Mirjalili S A. Taghavi K, Frawley G, Craw S. *Should we abandon landmark-based techniques for caudal anesthesia in neonates and infants? Paediatr Anaesth.* 2015 May 25 (5): 511-6. doi: 10.1111/pan.12576. Epub 2015 Jan. 16. PMID: 25597342. Further, accessing the epidural space may be difficult in older children if the sacrococcygeal membrane cannot be penetrated because of an advanced stage of ossification. Additionally, some complications, while still rare (e.g., dural puncture, inadvertent spinal anesthesia, and/or perforation of adjacent viscera from improper needle and catheter positioning), are more likely to occur in neonate and toddler patients. See e.g., Taenzer A H. Clark C 5th, Kovarik W D. *Experience with* 724 *epidurograms for epidural catheter placement in pediatric anesthesia. Reg Anesth Pain Med.* 2010 September-October; 35 (5): 432-5. doi: 10.1097/AAP.0b013e3181ef4b76. PMID: 20814284; and Sisay A. Girma B. Negusie T. Abdi S. Horsa B, Ayele K. *Inadvertent life-threatening total spinal anesthesia following caudal block in a preschool child underwent urologic surgery: A rare case report. Int J Surg Rep.* 2021 November: 88:106541. doi: 10.1016/j.jjscr.2021.106541. Epub 2021 Nov. 3. PMID: 34749172; PMCID: PMC8585616.

While not essential to the successful completion of caudal block procedures, ultrasound can be used to improve accuracy, success rate, and safety. For example, ultrasound images can identify sacrum anatomy and guide needle placement to ensure that the needle is correctly placed inside the sacral canal and that the dural sac is not punctured during the procedure. See Mirjalili S A. Taghavi K. Frawley G, Craw S. *Should we abandon landmark-based techniques for caudal anesthesia in neonates and infants? Paediatr Anaesth.* 2015 May: 25 (5): 511-6. doi: 10.1111/pan.12576. Epub 2015 Jan. 16. PMID: 25597342. For example, the practitioner, under ultrasound visualization, can guide the epidural catheter placement and confirm catheter tip location at a desired spinal level. Needle position can also be confirmed by administering a small amount of saline medication and confirming anterior displacement of the dura using the ultrasound. Accordingly, caudal epidural catheters placed under ultrasound guidance can be more accurately positioned than catheters placed by traditional methods (e.g., using external measurements alone). See Ponde V C, Bedekar V V, Desai A P, Puranik K A. *Does ultrasound guidance add accuracy to continuous caudal-epidural catheter placements in neonates and infants? Paediatr Anaesth.* 2017 October; 27 (10): 1010-1014. doi: 10.1111/pan.13212. Epub 2017 Aug. 10. PMID: 28795472.

In recent years, neuraxial simulation has become an increasingly important aspect of training for medical residents, fellows, and attending physicians. By periodically performing simulated procedures, practitioners gain confidence and experience, which can increase success rates for needle and catheter placement procedures. In addition, practitioners can use simulation devices to gain experience using ultrasound as an alternative to more traditional landmark techniques for caudal block procedures. Gaining more experience in using ultrasound will make it more likely that practitioners will use ultrasound when performing caudal epidural procedures on challenging patients.

SUMMARY OF THE INVENTION

There is a need for simulation devices, training systems, and training methods designed to allow practitioners to perform the specific actions required for caudal block procedures. Also, there is a need for simulation devices that encourage practitioners to perform caudal block procedures with ultrasound guidance, which is not always commonly used in medical facilities (e.g., pediatric hospitals). The devices, systems, and methods disclosed herein are provided to allow practitioners to practice caudal block procedures using models and devices including anatomically accurate representations of posterior portions (e.g., sacrum and spine) of a pediatric patient. Further, the simulation devices and systems can be used with conventional ultrasound machines to obtain images of internal portions of the simulation device. Accordingly, practitioners can use the simulation devices, systems, and methods disclosed herein to gain experience performing ultrasound guided caudal block procedures, improving the accuracy of needle and catheter placement, and avoiding complications such as dural sac puncture.

According to an aspect of the disclosure, a simulation device for an epidural block procedure includes an elongated internal frame formed from an ultrasound opaque material defining an axially extending channel accessible through a widened funnel portion of the internal frame. The device also includes a barrier positioned in the channel representative of anatomical structures that should not be contacted by an epidural needle and a body formed from an ultrasound penetrable material molded about and at least partially enclosing the internal frame configured to be pierced by the epidural needle. The body includes a top surface, a bottom surface, and peripheral surfaces extending between the top surface and the bottom surface. The internal frame is positioned so that the epidural needle can be inserted through one of the surfaces of the body and into the channel through the funnel portion to simulate insertion of the epidural needle into an epidural space (e.g., a caudal epidural space) during the epidural block procedure and to provide identifiable tactile, auditory, and/or visual feedback for a practitioner when the epidural needle contacts the barrier.

According to another aspect of the disclosure, a training system allowing a practitioner to practice performing an epidural block procedure includes: the previously described simulation device; and a needle having an electrode configured to contact the barrier of the simulation device to activate an indicator for providing the tactile, auditory, and/or visual feedback for the practitioner.

According to another aspect of the disclosure, a method of training for an epidural block procedure includes steps of: identifying an insertion location on one of the surfaces of the previously described simulation device; inserting a distal tip of the epidural needle at the identified insertion location on the simulation device; and advancing a catheter over the inserted needle and through the channel to a lumbar or thoracic level represented on the internal frame of the simulation device.

According to another aspect of the disclosure, a fabrication method for a simulation device for an epidural block procedure includes a step of forming a molded core of a simulation device by a molding process in which flowable polymer material is poured into a core mold containing an elongated rod representative of a spinal cord of a mammalian patient. The molded core encloses the rod and defines spaces representative of an epidural space (e.g., a caudal epidural space) in a sacral canal of the mammalian patient. The method also includes steps of: positioning the molded core within a channel of an internal frame of the simulation device, which is representative of a spine of the mammalian patient; and forming a molded body about the molded core and the internal frame by positioning the molded core and the internal frame within a body mold and pouring a flowable polymer material into the body mold to form the simulation device.

DESCRIPTION OF THE INVENTION

Figure 1A:
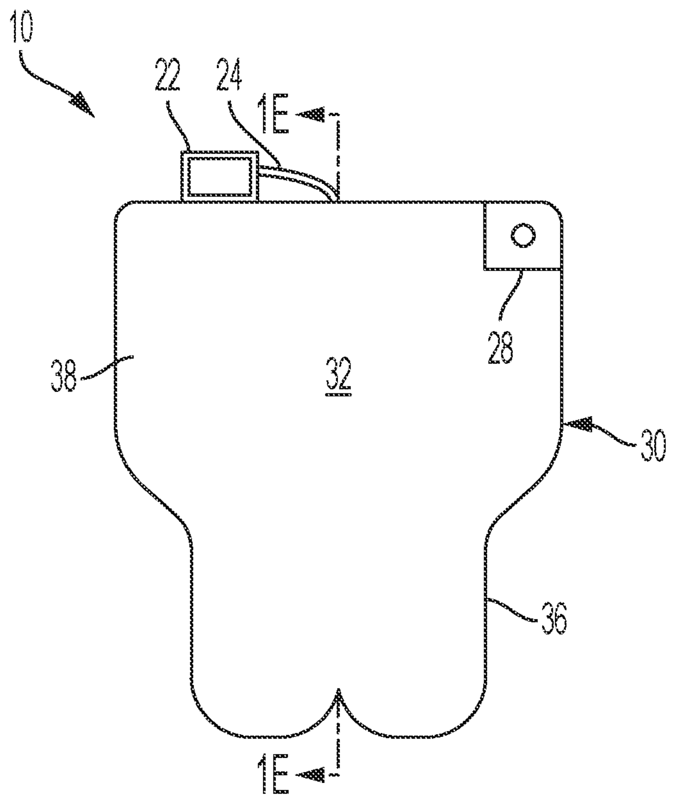
FIG. 1A is top view of a simulation device for an epidural block procedure, according to an example of the present disclosure.
Figure 1B:
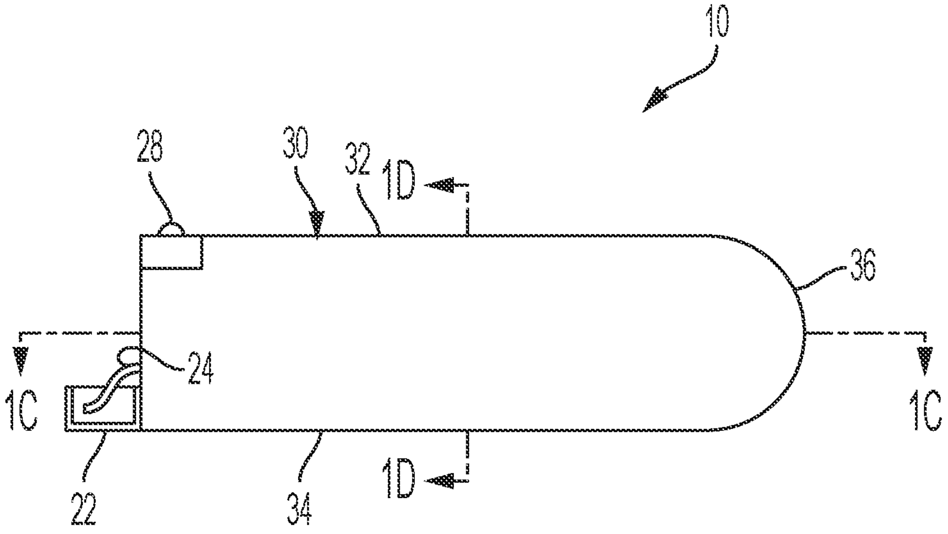
FIG. 1B is a side view of the simulation device of FIG. 1A.
Figure 1C:
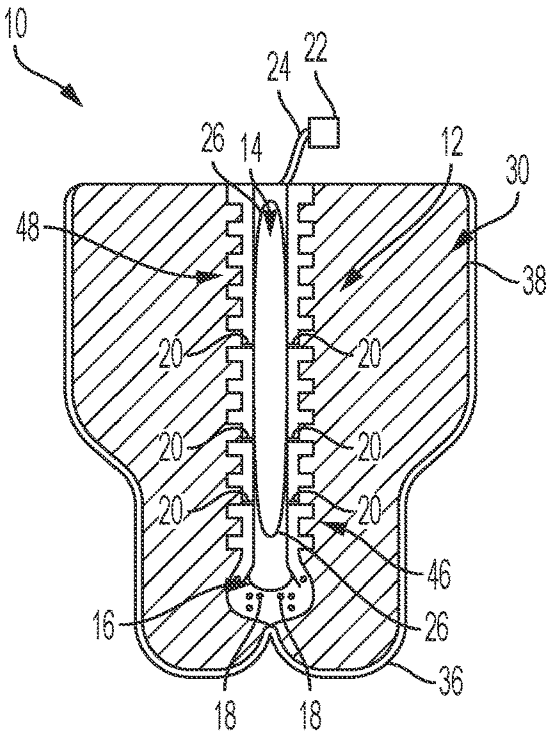
FIG. 1C is a cross-sectional view of the simulation device of FIG. 1A, taken along line 1C-1C in FIG. 1B.
Figure 1D:
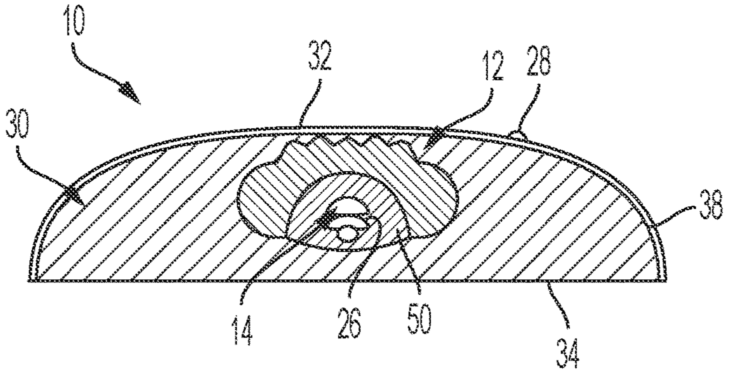
FIG. 1D is another cross-sectional view of the simulation device of FIG. 1A taken along line 1D-1D in FIG. 1A.
Figure 1E:
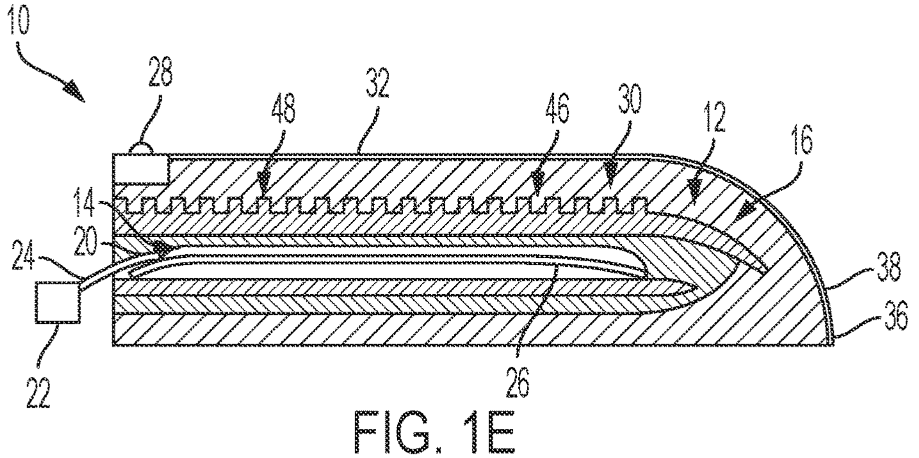
FIG. 1E is another cross-sectional view of the simulation device of FIG. 1A taken along line 1E-1E in FIG. 1A.

As used herein, the singular form of "a", "an", and "the" include plural referents unless the context clearly states otherwise.

As used herein, the terms "right", "left", "top", "bottom", and derivatives thereof shall relate to the invention as it is oriented in the drawing figures. The term "proximal" can refer to a portion of an object or device that is manipulated by a user and/or which is located farthest away from a target. By contrast, the term "distal" can refer to a portion of the object or device that is farthest away from the user or closest to the target of the object or device. For example, a "proximal end" of a catheter can refer to an end of a catheter outside of the patient's body, which can include a hub configured to be manipulated by a user. By contrast, the "distal end" of a catheter can refer to the end of the catheter that is implanted in the patient's body, such as within a vessel or organ of the patient. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Further, depicted elements are not necessarily to scale, but are depicted in a manner to facilitate the showing of any described element and its relation to other elements of a described device. Hence, specific dimensions and other physical characteristics related to the embodiments disclosed herein are not to be considered as limiting.

For the purposes of this specification, unless otherwise indicated, all numbers expressing, for example, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any measured numerical value, however, may inherently contain certain errors resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

As used herein, the terms "comprising", "comprise", or "comprised", and variations thereof, are meant to be open ended.

As used herein, the term "patient" refers to members of the animal kingdom including but not limited to human beings.

As used herein, the terms "communication" and "communicate" refer to the receipt or transfer of one or more signals, messages, commands, or other types of data. For one unit or component to be in communication with another unit or component means that the one unit or component is able to directly or indirectly receive data from and/or transmit data to the other unit or component. This can refer to a direct or indirect connection that can be wired and/or wireless in nature. Additionally, two units or components can be in communication with each other even though the data transmitted can be modified, processed, routed, and the like, between the first and second unit or component. For example, a first unit can be in communication with a second unit even though the first unit passively receives data and does not actively transmit data to the second unit. As another example, a first unit can be in communication with a second unit if an intermediary unit processes data from one unit and transmits processed data to the second unit. It will be appreciated that numerous other arrangements are possible.

The present disclosure is directed to anatomical models, simulation devices 10, and training systems 110 that allow medical practitioners, such as residents, fellows, and attending physicians, to practice performing epidural procedures. In some examples, the simulation devices 10 are used for practicing a single-injection, caudal block procedure including advancement of a caudal epidural catheter to the lumbar or thoracic levels of the spinal canal. Such procedures are commonly used for neuraxial analgesia for pediatric patients (e.g., for neonates, infants, and small children). By using the models, simulation devices 10, and systems 110 of the present disclosure, practitioners can gain familiarity with these procedures and can improve accuracy of needle and catheter placement.

In some examples, the anatomical model can comprise a three-dimensional model of the sacral, lumber, and thoracic portions of the spine. The model can be created directly from measurements (e.g., computed tomography images) for a specific patient or can be based on modified anatomical sizes and dimensions for a selected subset of patients (e.g., for patients of a particular age, height, weight, and/or gender) to achieve particular training goals.

The present inventors believe that by using the models, simulation devices 10, and training systems 110 disclosed herein practitioners can increase familiarity with caudal block procedures and improve pediatric regional anesthesia skills. The practitioners may also improve accuracy of landmark identification by palpation of caudal anatomical structures, such as the sacral cornua and/or sacral hiatus. Consequently, following sufficient practice, caudal block procedures may be less traumatic (fewer needle insertion attempts and a decreased number of catheter passes) and a success rate for needle insertion can be improved. In particular, practicing with the models and simulation devices 10 may improve confidence and success rates when these blocks are performed for challenging patients, such as minimal weight neonates or infants. Using the simulation devices 10 may also help practitioners to learn how to avoid catheter misplacement, preventing several recognized injuries that can occur including rectal perforation, placement of the catheter retroperitoneally, subarachnoid injection, and injuries to the conus medullaris.

In some examples, the models and simulation devices 10 disclosed herein are configured to be used to practice performing procedures with ultrasound guidance. Accordingly, the simulation device 10 can include a combination of ultrasound opaque materials (e.g., materials representative of bony structures of the spine and sacrum) and ultrasound transparent or penetrable materials (e.g., materials representative of soft tissues). A conventional or standard ultrasound device or machine can be used for obtaining images of the simulation device 10 while the simulated procedures are being performed. Obtained ultrasound images allow the practitioner to see a position of the epidural needle relative to the ultrasound opaque materials of the simulation device 10. Accordingly, the models, simulation devices 10, and training systems 110 disclosed herein can help practitioners to gain confidence in performing caudal block procedures with ultrasound guidance, encouraging more practitioners to use ultrasound for such procedures.

Simulation Device Including an Anatomical Model

FIGS. 1A-1E and FIG. 2 are drawings showing features of simulation devices 10 for epidural block procedures, such as single-injection, caudal block procedures. As shown in FIGS. 1A-1E, in some examples, the simulation device 10 comprises an elongated internal skeleton, scaffold, or frame 12 formed from an ultrasound opaque material. As used herein, an "ultrasound opaque material" refers to materials, such as bony structures, calcium deposits, and similar hard bodies, which are sufficiently dense to appear as white or opaque bodies in ultrasound images. For examples, thermoplastic materials, such as polyester, polycarbonate, polypropylene, polyethylene, polyethylene terephthalate, or acrylonitrile butadiene styrene, can be ultrasound opaque or sufficiently dense to appear solid in ultrasound images. The elongated frame 12 can define an axially extending channel 14 accessible through a widened funnel portion 16 of the internal frame 12. As described in further detail herein, in some examples, portions of the channel 14 can be filled with soft and/or deformable materials representative of soft body tissue. Other portions of the channel 14 can include empty spaces or voids, such as empty spaces representative of the epidural space.

In some examples, the internal frame 12 is configured to simulate a spine or spine portion of a patient, such as an animal, mammal, or human patient. For example, the internal frame 12 can be an elongated structure representative of sacral, lumbar, and/or thoracic portions of the spine. As used herein, a structure or object "simulates" an anatomical structure when the structure or object includes a substantial number of predominant features of the anatomical structure. However, it is understood that a structure or object may simulate an actual anatomical structure even when there are some substantial differences between the structure or object and the anatomical structure. For example, the internal frame 12 can include features of a spine or portion of a spine of a mammalian patient, including a plurality of disks representative of vertebrae connected together in series to form the spine, a conical portion representative of the coccyx or tailbone, and/or the funnel portion 16 representative of a sacral hiatus of the patient. The internal frame 12 can also include a rod 52, such as a 7 mm in diameter metal rod, representative of a spinal cord extending through the channel 14 of the frame 12. However, shapes of these structures may be simplified compared to actual anatomical structures. For example, the disks representative of the vertebrae can be circular in shape, rather than more complex shapes of actual vertebrae. Also, the funnel portion 16 representative of the sacral hiatus can be larger and/or more circular than an actual sacral hiatus structure to make it easier for practitioners to insert an epidural needle through the funnel portion 16 and into the channel 14.

In some examples, the internal frame 12 is configured to represent a flattened spine, which occurs when a patient is lying prone, as occurs during a caudal block procedure. Also, the internal frame 12 can include a cut-away portion, which is configured to receive other components of the spinal cavity, such as the rod 52 representative of the spinal cord or components representative of anatomical structures, such as blood vessels or the dural sac, which are disposed in the channel 14.

The internal frame 12 can also include anatomical landmark structures that can be palpated by the practitioner to perform aspects of the procedure. For example, the internal frame 12 can include raised protrusions 18 representative of sacral cornu positioned proximate to the funnel portion 16 of the internal frame 12. In some examples, the protrusions 18 representative of the sacral cornu can be enlarged or more pronounced than would be the case for an exact anatomical representation. Making the protrusions 18 larger and/or more pronounced can make palpation for identification of the sacral hiatus easier for a practitioner using the simulation device 10. The internal frame 12 can also include other landmarks and/or structures commonly identified by practitioners while performing epidural procedures, as are known in the art, such as structures that assist the practitioner to identify the sacral hiatus and/or to determine how far the needle and/or catheter are inserted into the sacral canal and/or epidural space.

As described in further detail herein, the internal frame 12 can also include representations other anatomical structures of the spine or spinal column. For example, the internal frame 12 can include a representation of the dural sac, which could terminate as low as the S3 vertebrae level in a neonate model or closer to the S2 vertebrae level for an adult model. As previously described, the internal frame 12 can also include a representation of the sacral hiatus, such as the funnel portion 16. The size and shape of the sacral hiatus can vary for different patients. In some examples, to visualize the end of the dural sac, the representation of the sacral hiatus or funnel portion 16 can be located over the S4 vertebrae and S5 vertebrae and can have a bifid shape over the S4. A tip of the sacral hiatus can be located above S3 vertebra.

In some examples, for the frame 12 of the present disclosure, a space between spine processes can be increased and a length of spinous processes can be decreased slightly compared to expected anatomical dimensions to improve ultrasound visualization for the catheter at different spine levels. Also, disk structures representative of the vertebrae can be provided with regular spacing between the vertebrae to aid in the confirmation of the catheter placement and to provide a more conspicuous "sacral window" to allow for needle placement confirmation.

As shown in FIGS. 1A-1E, the elongated internal frame 12 defines and/or at least partially encloses the channel 14 accessible through the funnel portion 16. In some examples, portions of the channel 14 can be filled with a soft deformable material that provides resistance to insertion of the epidural needle through the body. For example, the soft material can be a gel, foam, or liquid positioned in the channel 14 to provide resistance to insertion of the epidural needle. The axially extending channel 14 can be representative of or simulate portions of a sacral canal and/or spinal canal of the mammalian patient. Further, as previously described, the funnel portion 16 can be representative of the sacral hiatus at the caudal opening of the sacral canal. The funnel portion 16 and channel 14 defined by the internal frame 12 are positioned to permit the practitioner to insert the epidural needle into the channel 14 simulating the single injection that occurs when a practitioner inserts the epidural needle into the sacral canal of a patient through the sacral hiatus.

In some examples, the internal frame 12 further comprises one or more drainage openings 20 in fluid communication with the channel 14 for draining fluid from the channel 14. In particular, as described in further detail herein, the practitioner may inject fluid from a syringe barrel into the epidural space to confirm that the distal tip of the needle is in the epidural space and has not punctured the dural sac. Also, as described in further detail herein, if the dural sac is pierced, liquid can be released into the channel 14 to provide an indication to the practitioner that the dural sac has been punctured and that the simulated block procedure has failed. The drainage openings 20 can be positioned to allow the injected or released liquid to drain from the epidural space so that the simulation device 10 can be reused multiple times. In some examples, the simulation device 10 can also include a fluid container 22 in fluid communication with the drainage openings 20 for collecting liquid that drains from the channel 14. In some examples, the simulation device 10 can also include one or more segments of flexible tubing 24 extending between the drainage openings 20 and the drainage container 22 for conducting any liquid in the channel 14 from the distal openings 20 to the drainage container 22.

As previously described, the internal frame 12 can be created from anatomical dimensions for a specific patient or based on modified dimensions determined from median or average dimensions for a subset or particular group of patients (e.g., patients of the same age, weight, height, and/or gender). Further, the internal frame 12 can be manufactured by common manufacturing processes for making rigid objects formed from thermoplastic materials. For example, the internal frame 12 can be made by additive manufacturing or three-dimensional printing. In other examples, portions of the internal frame 12 can be made from common molding techniques for thermoplastic objects, such as injection molding.

The simulation device 10 also includes a barrier 26 positioned in and/or extending parallel to portions of the channel 14. The barrier 26 can be representative of anatomical structures that should not be contacted by an epidural needle. For example, the barrier 26 can be representative of blood vessels and/or a dural sac disposed in the channel 14 or sacral canal, which should not be contacted or pierced by the epidural needle.

In some examples, the barrier 26 is configured to provide feedback, such as tactile, auditory, and/or visual feedback, for the practitioner to let the practitioner know when the epidural needle contacts the barrier 26. For example, the barrier 26 can comprise an electronic sensing device, such as a transducer, electrode, or contact sensor, electrically connected to an indicator 28 or feedback device configured to detect metal objects in proximity to the sensing device. When the metal epidural needle contacts the electronic sensing device, the sensing device can provide a signal to the indicator 28 causing the indicator 28 to provide an indication to the practitioner that the needle is in an incorrect location. In some examples, the needle can include a corresponding electrode that activates the electronic sensing device upon contact. In other examples, the electronic sensing device can be a pressures sensor or transducer that identifies when the needle presses against the electronic sensing device and transmits the signal to the indicator 28 or feedback device.

In some examples, the indicator 28 or feedback device is a tactile, auditory, and/or visual emitter configured to provide tactile, auditory, and/or visual feedback to the practitioner. For example, the indicator 28 can be a vibrator that activates to inform the practitioner that contact has occurred. In other examples, the indicator 28 or feedback device can be an audio device (e.g., a speaker or buzzer) or a visual feedback device, such as a light emitting diode or visual display, which changes in appearance when contact between the needle and electronic sensing device occurs. For example, when the metal epidural needle contacts the barrier 26, the indicator 28 can produce a vibration and audible buzz informing the practitioner that the needle is incorrectly positioned in the channel 14 and has contacted the barrier 26.

In other examples, the barrier 26 can be a simulated, pierceable dural sac and/or a simulated pierceable blood vessel(s) positioned in the channel 14. The simulated dural sac and/or blood vessels can be tubular members, enclosures, or containers disposed in the channel 14 formed from pierceable materials, such as a thin flexible plastic sheet (e.g., a polyvinyl chloride (PVC), low density polyethylene, or high density polyethylene (HDPE) sheet). In some examples, the simulated dural sac and/or vessels can be filled with a liquid that releases into the channel 14 when the vessel or sac is pierced by the epidural needle. Accordingly, the filled simulated dural sac and/or vessels can be removable and replaceable. For example, following completion of a simulated epidural procedure, the practitioner, trainer, or preceptor can remove the empty pierced vessel or sac and replace it with a new filled vessel or sac, which can be used for a subsequent simulated procedure.

In some examples, the simulated vessel(s) and the simulated dural sac can be filled with different types of liquids, such as liquids of a different color, viscosity, transparency, or other characteristics, to show the practitioner which simulated structure has been pierced. For example, liquid released from the simulated dural sac can be clear, similar to liquid released from a dural sac of a patient during an actual epidural block procedure. The liquid in the simulated blood vessel(s) can be a different color, such as red or purple, similar in appearance to arterial or venous blood. Using different color liquids allows the practitioner to distinguish between piercing the simulated dural sac and piercing the simulated blood vessel(s) based on which color liquid is aspirated into the syringe during the simulated procedure. As previously described, the simulation device 10 can also include the drainage openings 20 and flexible tubing 24 extending through the channel 14 for draining liquids from the channel 14 so that the simulation device 10 can be used for multiple simulated procedures. For example, liquids can drain from the channel 14, through the drainage openings 20 and/or flexible tube 24, and can be collected in a drainage container 22 of the simulation device 10.

The simulation device 10 further comprises a body 30 formed from an ultrasound penetrable material molded about and at least partially enclosing the internal frame 12. As used herein, an "ultrasound penetrable" or "ultrasound transparent" material refers to types of low density materials that allow transmission of sound waves and which do not appear in ultrasound images. For example, soft body tissues are ultrasound penetrable materials. Also, various liquids, gels, and foams, such as gels and foams comprising low-density elastomeric materials, can be ultrasound penetrable materials.

The body 30 is configured to be pierced by the epidural needle during a simulated epidural procedure. As shown in FIGS. 1A-1E, the body 30 can comprise a top surface 32, a bottom surface 34, and peripheral surfaces 36 extending between the top surface 32 and the bottom surface 34. In some examples, surfaces 32, 34, 36 of the body 30 are generally shaped to resemble a posterior portion of a patient, such as a human or animal patient. For example, portions of the body 30 can be molded to resemble or represent areas of a patient's lower back and buttocks.

As previously described, the body 30 can be formed from various types of ultrasound penetrable materials, such as liquids, gels, or foams. For example, the body 30 can be formed from thermoplastic elastomers, such as silicone, polypropylene, polyvinylchloride, polyethylene, or synthetic or natural rubber (e.g., isoprene). In some examples, the body 30 can be formed from plastisol. Plastisol is a colloidal dispersion of small polymer particles, such as polyvinylchloride particles, in a liquid plasticizer. A commercially available plastisol material called Alumisol (e.g., 6:1:0.75 Alumisol combined with mineral oil softener), which can be used for forming the body 30 of the simulation device 10, is made by Alumilite Corporation of Kalamazoo, MI. In some examples, the Alumisol material for forming the body 30 can also be combined with silica gel (e.g., 1 g/300 mL of silica gel) and/or dye (e.g., a white or beige dye).

Material properties and other characteristics of the body 30 material can be selected by those skilled in the art to achieve certain training goals and/or to better simulate procedures performed for a particular group of patients. In particular, selected materials can have a density similar to soft body tissues and/or fat. Further, materials should be sufficiently durable to be pierced multiple times so that the simulation device 10 can be reused often. In some examples, the material of the body 30 can be transparent or translucent so that practitioners and/or other individuals, such as preceptors or trainers, can see advancement of the epidural needle through the body 30, both through transparent or translucent material of the body 30 and through ultrasound images of the body 30 obtained by an ultrasound probe, such as a linear high-frequency ultrasound probe. In other examples, as previously described, the body 30 material can be mixed with dyes to control color of the body 30.

In some examples, the body 30 comprises an exterior coating, layers, film, or skin 38 enclosing other portions of the body 30. For example, the exterior skin 38 can surround some or all portions of the body 30 formed from softer materials (e.g., materials that simulates soft tissues and internal fat deposits). The exterior coating, layers, film, or skin 38 can be formed from a translucent or opaque material that is tougher and/or harder than (e.g., has a durometer greater than) the body 30 material representative of the soft tissue. In some examples, the exterior skin 38 can be formed from a material having properties, such as hardness or density, resembling human skin. In particular, the exterior skin 38 can be formed from a material that behaves similar to human skin when pierced by the epidural needle, in order to increase realism of the simulated procedure. In particular, the amount of force required to push the epidural needle through the coating, layers, film, or skin 38 can be similar to force required to perform a caudal injection for a real pediatric patient. Further, once the exterior skin 38 is pierced, the needle can move through the material of the body 30 of the simulation device 10 more easily and with less force, which resembles how a needle moves through soft tissue of a human body. The exterior coating, layers, film, or skin 38 can comprise similar elastomeric materials as other portions of the body 30. However, the material composition can be modified to increase toughness, hardness, and other physical properties using conventional polymer forming processes, known in the art, so that the material more closely resembles skin. In particular, the exterior skin 38 can be formed from silicone, polypropylene, polyvinylchloride, polyethylene, or synthetic or natural rubber (e.g., isoprene).

In some examples, the exterior coating, film, layers, or skin 38 can be applied to other portions of the body 30 by a variety of different application techniques. For example, a coating can be applied directly to other surfaces 32, 34, 36 of the body 30 using a brush, spray nozzle, or other deposition techniques, as are known in the art. Alternatively, the skin 38 can be positioned in a mold prior to pouring a polymer precursor or another uncured material into the mold to form the body 30. When the material in the mold is cured, the exterior film or skin 38 adheres to other portions of the body 30, thereby forming a completed simulation device 10 with an exterior skin 38 enclosing a soft body 30.

In some examples, the simulation device 10 can be provided with a carrying case 40 (shown in FIG. 3) or bag to make it easier to transport the simulation device 10 between different training sites and/or to different medical facilities. For example, the carrying case 40 can be a box or enclosure surrounding the body 30 of the simulation device 10, which opens or unfolds so that the practitioner can access the simulation device 10. In some examples, the body 30 of the simulation device 10 can be fixed or adhered to a portion of the carrying case 40 and can remain attached to the carrying case 40 when the simulation device 10 is in use. For example, the bottom surface 34 of the body 30 can be adhered to an interior surface of the carrying case 40 by an adhesive or mechanical fasteners, as are known in the art. In other examples, the body 30 of the simulation device 10 can be removed from the carrying case 40 when ready to be used and placed back in the carrying case 40 after a simulated procedure is completed. In some examples, the carrying case 40 can also include structures for carrying and/or moving the simulation device 10, such as a handle and/or backpack straps.

Figure 2:
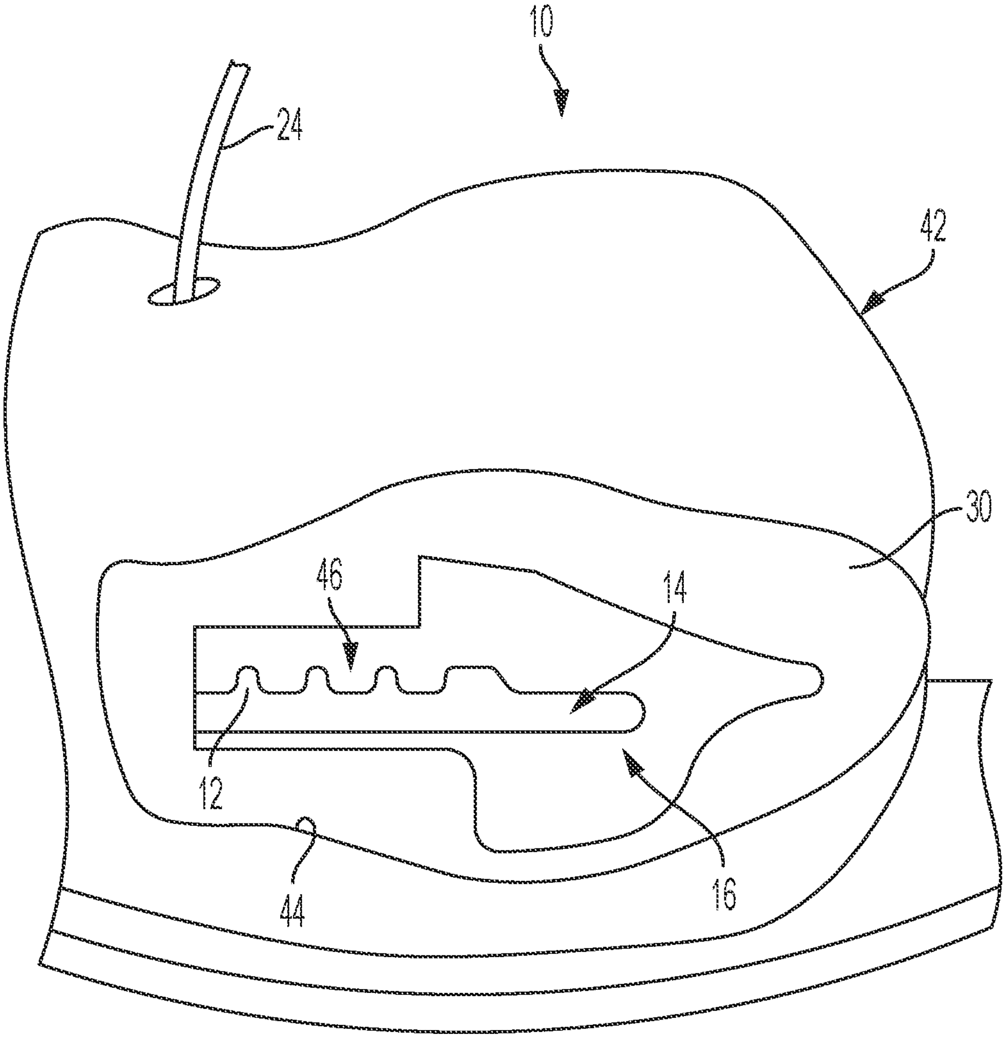
FIG. 2 is a perspective view of another example of a simulation device for an epidural block procedure including a mannequin with structures representative of a posterior portion of a pediatric patient.

FIG. 2 shows another example of a simulation device 10 for an epidural block procedure. As in previous examples, the simulation device 10 includes the elongated internal frame 12 that defines the elongated channel 14 and which can be configured to simulate portions of a spine of an animal, mammalian, or human patient. While not shown in FIG. 2, the simulation device 10 can also include the barrier 26, which can be configured to simulate the dural sac and/or blood vessels in the channel 14 or sacral canal. The simulation device 10 also includes the body 30 formed from the soft, ultrasound penetrable material enclosing the internal frame 12.

However, unlike in previous examples, the body 30 of the simulation device 10 is not shaped like a posterior portion of a patient's body. Instead, as shown in FIG. 2, the body 30 is a more generic shape, such as a generally elongated, box-shaped, or tubular structure enclosing the internal frame 12. Also, the simulation device 10 further comprises a doll or mannequin 42 representative of a posterior portion an animal, mammal, or human body. In particular, the mannequin 42 can represent an appearance of a human pediatric patient, such as a neonate, infant, or small child. As used herein, a "mannequin" refers to a sculpture, assembly, or another object that includes structures shaped to resemble anatomical structures of a human or animal. While it is understood that the mannequin 42 need not be an exact representation of a human or animal and need not include all external features of a human or animal, the mannequin 42 includes many human or animal features to provide a more realistic simulation experience for practitioners using the simulation device 10. For example, the mannequin 42 can include several predominant features of a posterior portion of a patient including representations of the buttocks, lower back, upper thighs, and other prominent posterior anatomical structures. The mannequin 42 can also include representations of portions of the spine and sacrum on the lower back portion of the mannequin 42. In particular, the mannequin 42 can include representations of sacral portions of the spine, which can be felt on the mannequin 42 by the practitioner to help to identify a correct insertion site for the epidural needle.

As shown in FIG. 2, the mannequin 42 includes or defines a caudal cavity 44, which is a depression or empty space in the mannequin 42 at the caudal portion of the spine. The body 30 of the simulation device 10 and the internal frame 12 enclosed therein are sized to be received within the caudal cavity 44 of the mannequin 42, as shown in FIG. 2. In some examples, including the mannequin 42 with the simulation device 10 allows the practitioner to practice positioning a patient in a desired position prior to performing a caudal block procedure. For example, the practitioner may move the mannequin 42 so that it is resting on its side. Once the mannequin 42 is in a desired position, the practitioner can insert the epidural needle through the exterior skin 38 and the body 30 of the simulation device 10 towards the channel 14 or sacral canal defined by the internal frame 12, as in previous examples. Accordingly, using the mannequin 42 increases realism of the simulated procedure, thereby improving the user experience and likelihood that using the device 10 will improve practitioner performance and procedure outcomes.

Training System with a Simulation Device

Figure 3:
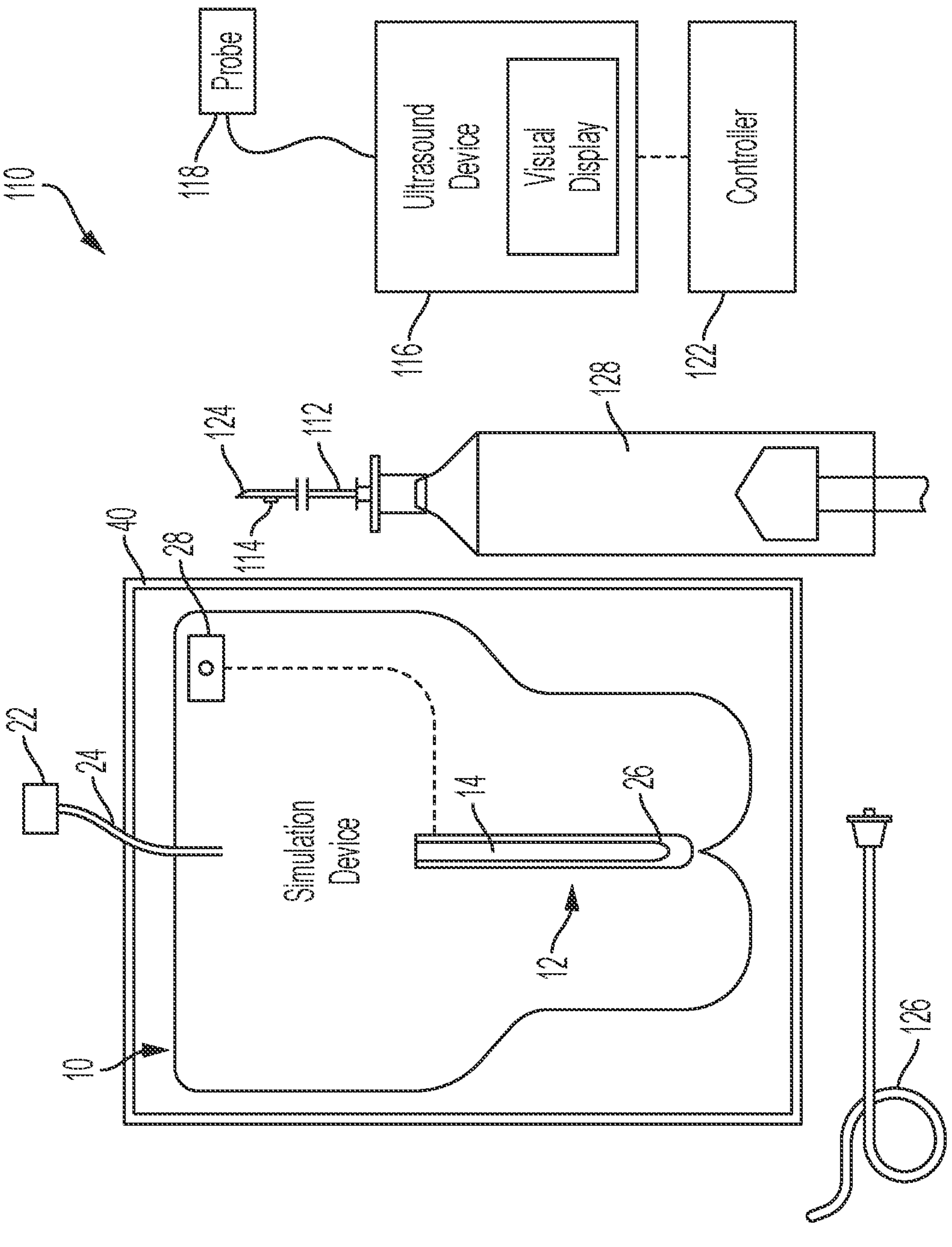
FIG. 3 is a schematic drawing of a training system including a simulation device for an epidural block procedure, according to an aspect of the present disclosure.

FIG. 3 is a schematic drawing depicting features of a training system 110 for performing the epidural procedure, such as a single-injection caudal block procedure. The system 110 includes one or more of the previously described simulation devices 10 shown in FIGS. 1A-1E and FIG. 2.

The system 110 also includes a modified epidural needle 112, including a probe, electrode 114, or electrical current generator attached to and/or integral with the needle 112. The probe, electrode 114, or current generator of the epidural needle 112 is configured to contact and actuate the electronic sensing device or barrier 26 of the simulation device 10 to provide user feedback when the epidural needle 112 is in an incorrect position.

More specifically, as previously described, the simulation device 10 comprises the elongated internal frame 12 that defines the channel 14 representative of the sacral canal and the barrier 26 positioned in the channel 14 representative of anatomical structures in the sacral canal, such as the dural sac. The practitioner should avoid contacting the barrier 26 with the needle 112. As previously described, the barrier 26 can be an electronic sensor device electrically connected to the indicator 28 or feedback device. For example, the sensor device can be an electrode that creates an electrical circuit upon contact with the electrode 114 of the needle 112. As previously described, when the electronic sensing device is contacted by the needle 112, the sensing device can be configured to provide a signal to the indicator 28 or feedback device causing the indicator 28 or feedback device to emit an indication that contact with the epidural needle 112 has occurred.

In some examples, the system 110 further comprises an ultrasound device 116 comprising an ultrasound probe 118 and a visual display 120 for providing ultrasound images in real-time. The ultrasound probe 118 can be a hand-held scanner device configured to slide over the exterior skin 38 of the body 30 for obtaining images of internal structures of the simulation device 10 during the simulated procedure. The ultrasound device 116 can be any conventional ultrasound machine used in medical facilities for providing ultrasound images during surgical procedure, such as ultrasound machines manufactured by Samsung, GE Healthcare, Philips Healthcare, Sonosite, and others. As described in further detail herein, during the simulated procedure, the practitioner can position the ultrasound probe 118 over portions of the body 30 of the simulation device 10 for obtaining images of the internal frame 12 and/or epidural needle 112 inserted through the body 30. Accordingly, the practitioner can gain familiarity and confidence in positioning the probe 118 to obtain useful ultrasound images and in using the ultrasound images to guide performance of the caudal block procedure.

In some examples, the system 110 can further comprise a controller 122 or control device electrically connected to electronic devices of the system 110 for receiving information from and controlling operation of the different electronic devices of the system 110. For example, the controller 122 can be electrically connected to the barrier 26 and/or indicator 28 for receiving information collected during the simulated procedure about contact between the needle 112 and the barrier 26. In some examples, the controller 122 can be configured to record and/or analyze the received information, such as information about a number of times that the needle 112 contacts the barrier 26 and/or about an amount of pressure or force exerted on the barrier 26 by the needle 112. The controller 122 can also be configured to record other information about the simulated procedure including, for example, a total duration of the procedure or an amount of time required to perform certain aspects of the procedure, such as time required to identify an insertion site or time required to advance the catheter over the needle to the lumbar or thoracic levels.

In some examples, the controller 122 can also be connected to the ultrasound device 116. For example, the controller 122 can be configured to receive and record the ultrasound images obtained by the ultrasound device 116 during the simulated procedure. Also, the controller 122 can be configured to identify ultrasound images related to certain aspects of the procedure. For example, controller 122 can be configured to identify any ultrasound images showing the needle 112 in the epidural space or images showing the needle 112 in contact with the barrier 26. In some examples, the controller 122 can also cause certain information about the simulated procedure to be displayed on the visual display 120 of the ultrasound device 116. For example, the controller 122 can cause a notification or alert to be displayed on the visual display 120 of the ultrasound device 116 when the needle 112 contacts the barrier 26. The controller 122 can also cause certain real-time statistics about the simulated procedure to be displayed on the visual display 120. For example, the controller 122 may provide a running clock or elapsed time indication on the visual display 120. Also, information, such as needle depth, angle, and/or distance between the needle and the dural sac may be displayed. In other examples, a number of times that the needle 112 has contacted the barrier 26 may also be displayed. Following completion of the simulated procedure, the controller 112 can be configured to cause a procedure summary to appear on the visual display 120. For example, the procedure summary can include information, such as the total time of the simulated procedure, final position of the needle or catheter (e.g., level of the distal end of the catheter relative to the spine), and information about whether the simulated procedure was successful.

In some examples, the controller 122 or control device can be a standalone device, such as a portable or handheld computer device or smartphone running a software application configured to obtain information from the simulation device 10. In other examples, the controller 122 or control device can be a component of another computer device used during the simulated procedure, such as the ultrasound device 116. The ultrasound device 116 can then be electrically connected to other electrical components of the simulation device 10, such as the electronic sensor device or barrier 26, by a wired or wireless data connection.

Training Methods Using a Simulation Device

Figure 4:
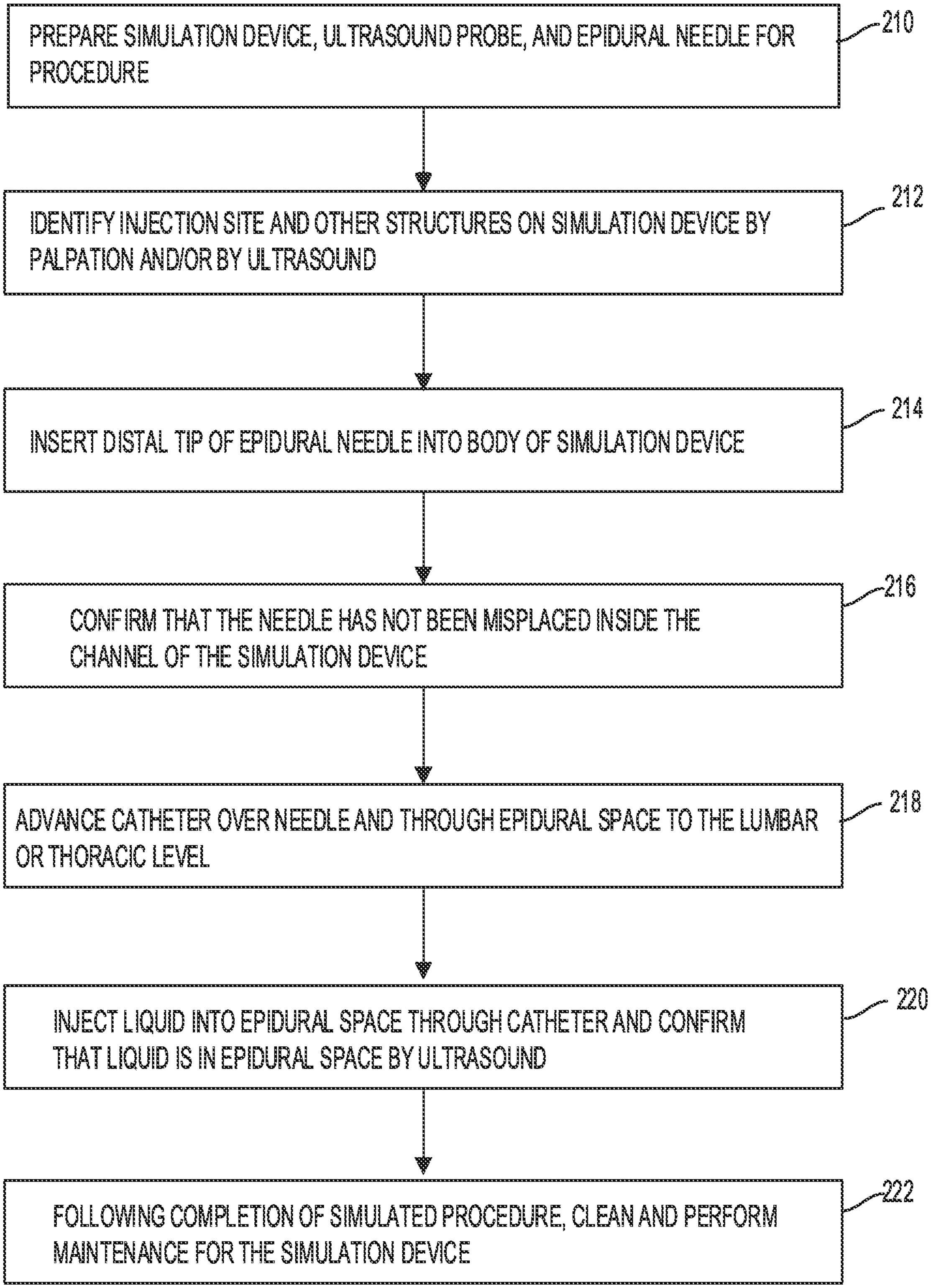
FIG. 4 is a flow chart showing a training method for an epidural procedure using a simulation device, according to an aspect of the present disclosure.
Figure 5A:
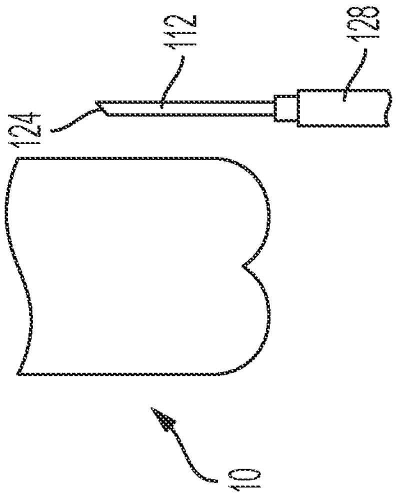
FIGS. 5A-5E are schematic drawings showing actions performed by a practitioner using a simulation device to practice performing an epidural procedure, according to aspects of the present disclosure.
Figure 5B:
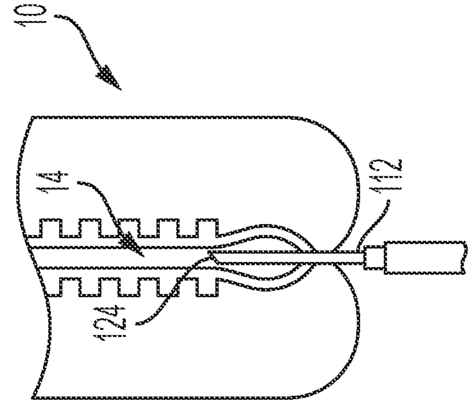
Figure 5C:
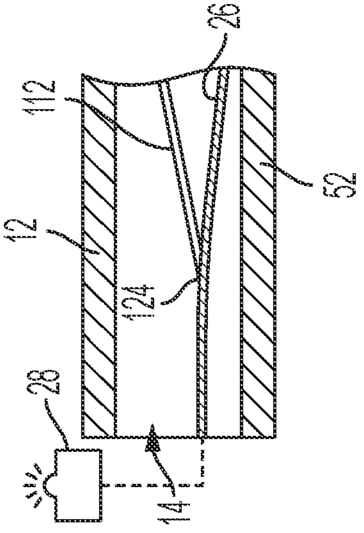
Figure 5D:
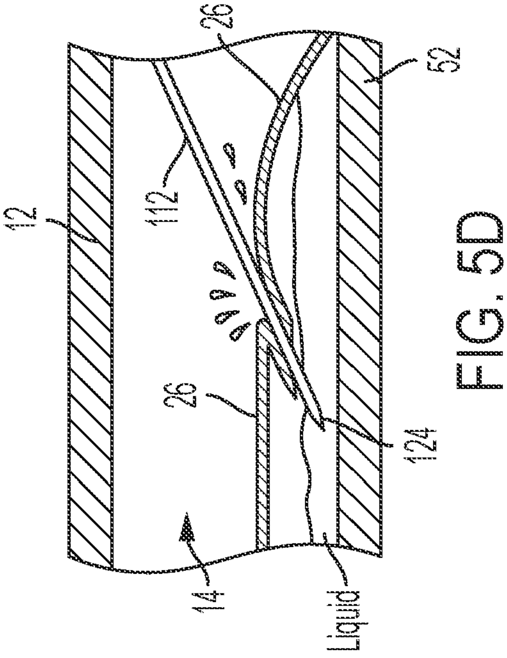
Figure 5E:
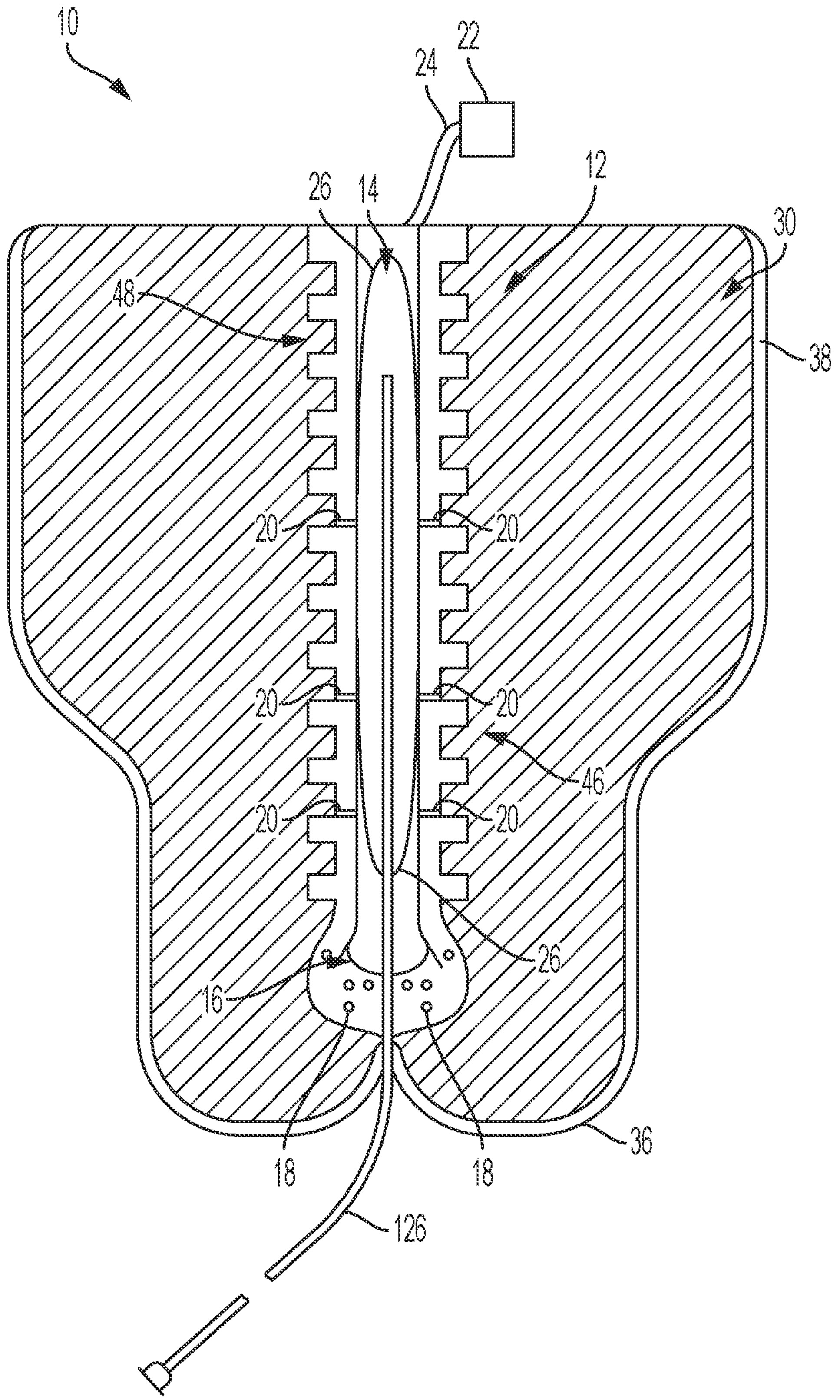

FIG. 4 is a flow chart showing a method for performing a simulated epidural procedure using the exemplary simulation devices 10 disclosed herein. FIGS. 5A-5E are schematic drawings showing different steps of the epidural procedure. Specifically, FIG. 5A shows the simulation device 10 and an epidural needle 112 prior to insertion of the needle 112 into the body 30 of the simulation device 10. FIG. 5B shows the needle 112 inserted into the body 30 of the simulation device 10 with a distal tip 124 of the needle 112 in the portion of the channel 14 representative of the epidural space proximate to the internal frame 12. FIGS. 5C and 5D show the needle 112 incorrectly positioned in the epidural space with the distal tip 124 of the needle 112 in contact with or having pierced the barrier 26. FIG. 5E shows a catheter 126 advanced over the needle 112 to a lumbar level 46 or a thoracic level 48 of the internal frame 12, which is representative of the spine of a patient.

At step 210, the method initially comprises performing any initial preparations needed to prepare the patient (e.g., the simulation device 10), the epidural needle 112, and/or the ultrasound probe 118 for the procedure. For example, the practitioner may obtain the epidural needle 112, which can be connected to a fluid delivery device, such as a syringe 128. The practitioner can then remove any packaging, including caps, shields, and other protective structures, from the needle 112 and syringe 128 so that the needle 112 is ready for use. The practitioner may also position the simulation device 10 in a correct body position for performing the procedure. For example, as previously described, a patient may be positioned on his or her side when performing a single-injection, caudal block procedure. Accordingly, the practitioner may rotate the mannequin 42 or doll of the simulation device 10, such that the mannequin 42 is on its side with the caudal injection site within easy reach of the practitioner. The needle 112 in a ready for use configuration in proximity to the simulation device 10 is shown in FIG. 5A.

At step 212, the practitioner next identifies the injection site and final catheter position site by palpation and/or by ultrasound. For example, to identify the injection site, the practitioner can first palpate the caudal region of the simulation device 10 to identify structures representative of the sacral cornua. The practitioner can also palpate the spine to identify positions of lumbar and thoracic vertebrae, which can be a final position for a distal end of the catheter 126. The practitioner can mark these positions using a pen or marker. The practitioner can then apply ultrasound gel over the skin proximate to the sacral cornua and use an ultrasound probe 118 to locate other anatomical structures of importance for the epidural procedure. For example, the practitioner can place the ultrasound probe 118 transversely (short axis view) over the palpated sacral cornua to visualize structures of the internal frame 12 representative of the sacral cornua, the sacrococcygeal ligament, sacral hiatus opening, the sacral cannel, and the floor of the sacral canal. The practitioner can also try to visualize an end of the dural sac. The practitioner can also move the ultrasound probe 118 to locate the dural sac and epidural space. For example, the practitioner can rotate the ultrasound probe by 90 degrees to a long axis resting between the two sacral cornua and obtain a longitudinal sonographic view of the channel 14 or sacral canal. The practitioner then advances the ultrasound probe 118 cranially until the dural sac appears in obtained ultrasound images. Once a more precise positon of the epidural space and dural sac is known, the practitioner selects an injection site proximate to the sacral hiatus and/or sacral canal. The practitioner may also clean and sanitize the injection site using, for example, alcohol or other disinfecting solutions, as are known in the art.

Once the injection site is determined, at step 214, the practitioner inserts the distal tip 124 of the needle 112 into the body 30 of the simulation device 10 at the identified injection site. Insertion of the needle 112 can be viewed on the ultrasound images. When inserting the needle 112, the practitioner may feel slight resistance as the needle punctures the exterior skin 38 of the simulation device 10. The practitioner then advances the needle 112 through the body 30 of the simulation device 10 and into the channel 14 defined by the internal frame 12 through the funnel portion 16. The practitioner continues to advance the needle 112 until the distal tip 124 of the needle 112 is positioned in an area of the channel 14 representative of the epidural space. In some examples, the practitioner may feel a second area of resistance representing ligamentum flavum as the epidural space is entered. A schematic drawing showing the distal tip 124 of the needle 112 in the epidural space is shown in FIG. 5B.

As previously described, the simulation devices 10 of the present disclosure are configured to provide feedback when the needle 112 is positioned incorrectly, such as when the needle 112 pierces the barrier 26, which is representative of blood vessels, or the dural sac in the channel 14 or sacral canal. For example, the barrier 26 can be an electronic device that provides a tactile, audio, or visual indication when the distal tip 124 of the needle 112 contacts the barrier 26, as shown schematically in FIG. 5C.

In other examples, as shown in FIG. 5D, the barrier 26 can be a container or enclosure that contains liquid. When the needle 112 pierces the container or enclosure of the barrier 26, the liquid is released into the channel 14. At step 216, the practitioner can attempt to confirm that the needle 112 was not misplaced within the channel 14. For example, in order to determine whether the dural sac is intact, the practitioner can attempt to aspirate fluid from the channel 14 through the needle 112 into a syringe 128. If no fluid is present in the channel 14 to aspirate into the syringe 128, it can indicate that the distal tip 124 of the needle 112 is in a portion of the body 30 and not in empty space of the channel 14. In that case, the practitioner can remove the needle 112 from the body 30 and begin the procedure again. If only blood vessel(s) are punctured, the red or purple fluid can be aspirated through the needle 112 into the syringe 128. If the aspirated fluid is clear, it can indicate that the dural sac has been pierced.

In some examples, the practitioner can also attempt to confirm that the dural sac is intact by visualization. For example, the practitioner may expel a fluid, such as saline, into the channel 14 through the distal tip 124 of the needle 112 toward the barrier 26 representative of the dorsal sac. The practitioner can view the ultrasound images to attempt to observe confirmation that the barrier 26 representative of the dural sac is intact. For example, the practitioner can review the ultrasound images to identify whether the barrier flexes, flutters, or flaps due to the injected air, which can indicate that the barrier 26 is intact.

At step 218, once the distal tip 124 of the needle 112 is correctly positioned in the portion of the channel 14 representative of the epidural space, the practitioner can advance the catheter 126 over the needle 112 to a desired position proximate to the internal frame 12, which simulates the patient's spine, using ultrasound guidance. For example, as shown in FIG. 5E, the catheter 126 can be advanced over the needle 112 to a lumbar level 46 or thoracic level 48 of the internal frame 12. Advancement of the catheter 126 can be monitored by ultrasound. For example, the practitioner can position the ultrasound probe 118 on the exterior skin 38 over a distal end of the catheter 126. The practitioner can move the probe 118 along the elongated frame 12 or spine until the catheter 126 reaches the desired level or position. Once the catheter 126 is in the desired position, images from the ultrasound probe 118 can also be used to confirm that the catheter 126 is in a desired transverse orientation.

Once the catheter 126 is correctly positioned at the desired level, the catheter 126 is ready to receive a medical agent injected toward the spine for the block procedure. In order to simulate the injection, at step 220, the practitioner may practice injecting a liquid, such as saline, from a fluid injection device, such as the syringe 128, through a lumen of the catheter 126. Once the fluid injection is performed, the practitioner can remove the catheter 126 and needle 112 from the body 30 and prepare to perform the simulated procedure again to obtain additional practice in performance of the procedure.

At step 222, after the simulated procedure is completed, the practitioner or trainer can perform simple maintenance for the simulation device 10. For example, the practitioner can thoroughly wipe off all ultrasound gel from the skin 38 of the simulation device 10 and can empty the drainage container 20. Once these tasks are completed, the practitioner can position the simulation device 10 in the carrying case 40 so that it is ready for a subsequent use.

Fabrication Method

Figure 6:
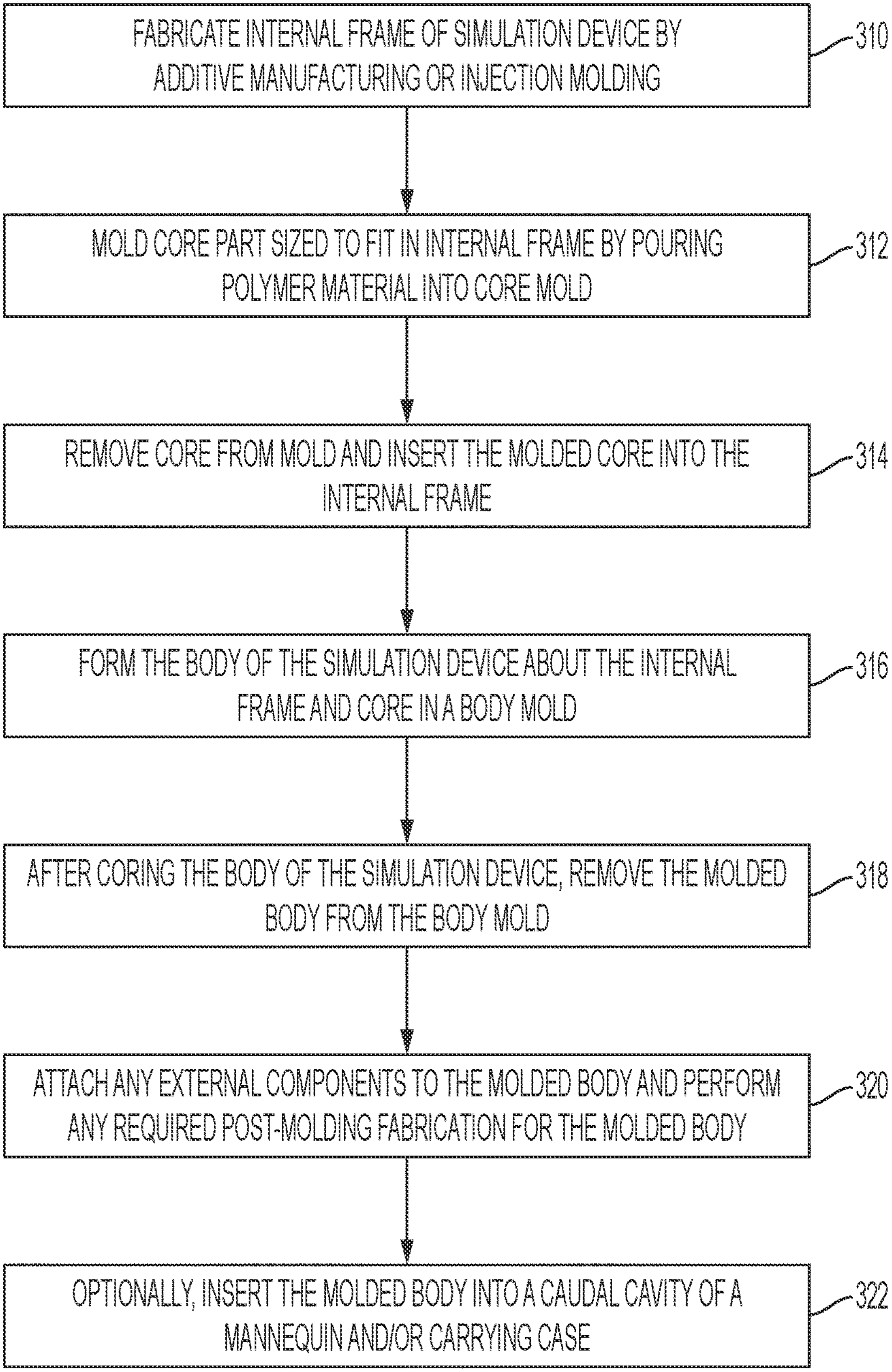
FIG. 6 is a flow chart showing a fabrication method for a simulation device for an epidural block procedure, according to an aspect of the present disclosure.
Figure 7A:
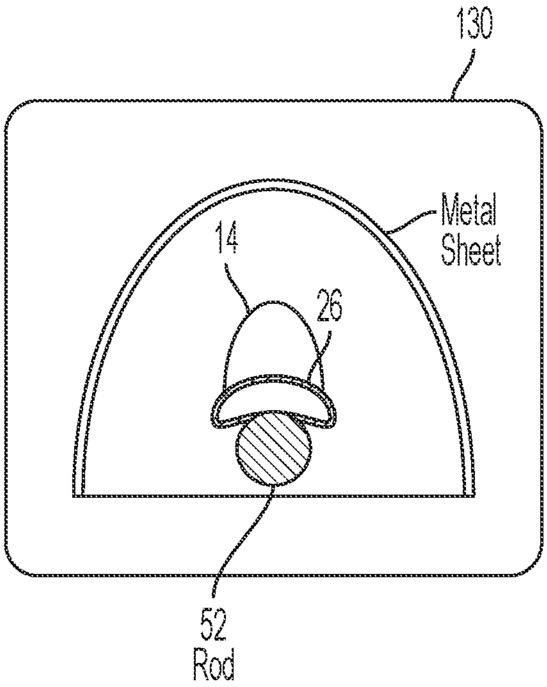
FIGS. 7A-7E are schematic drawings showing fabrication steps for making the simulation device in accordance with the method shown in FIG. 6.
Figure 7B:
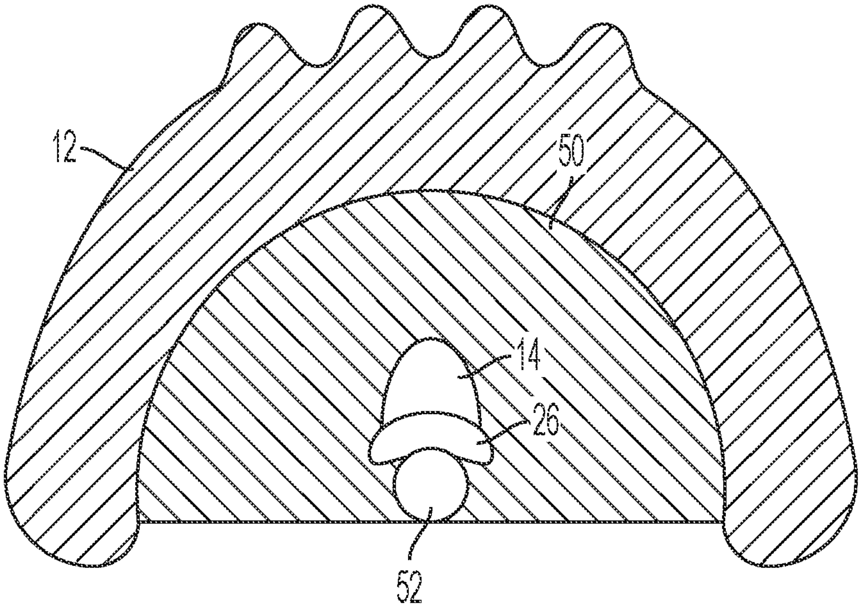
Figure 7C:
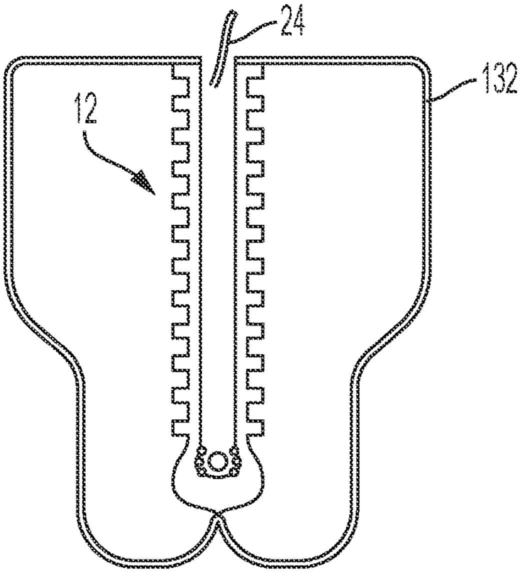
Figure 7D:
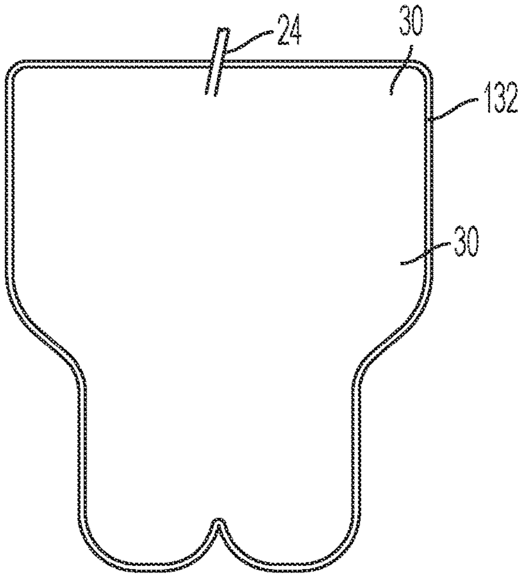
Figure 7E:
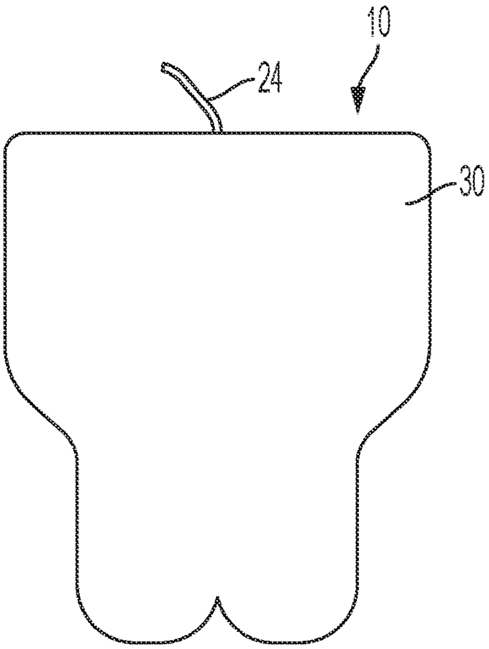

FIG. 6 is a flow chart showing steps of a method for making the simulation devices 10 of the present disclosure, which are configured to provide training for performance of epidural procedures, such as performance of the single-injection caudal block procedure. FIGS. 7A-7E are schematic drawings showing steps for fabricating the simulation device 10. In particular, FIG. 7A shows a core mold 130 for making a core 50 of the simulation device 10, which includes the rod 52 representative of the spinal cord and the channel 14 representative of the sacral canal and epidural space. FIG. 7B shows the molded core 50 of the simulation device 10 formed from the core mold 130 inserted into the internal frame 12 of the simulation device 10. FIG. 7C shows a body mold 132 for forming a body 30 of the simulation device 10 with the previously molded core 50 suspended in the body 30. FIG. 7D shows the molded body 30 positioned in the body mold 132. FIG. 7E shows a completed molded simulation device 10 that is ready for use for performance of simulated epidural procedures.

In order to make the simulation devices 10 of the present disclosure, at step 310, the internal frame 12 is fabricated by an additive manufacturing (e.g., 3D printing) or a molding process, as are known in the art. As previously described, the internal frame 12 simulates a spine or a portion of a spine of a pediatric (e.g., neonate, infant, or small child) patient. In some examples, the internal frame 12 can be produced from anatomical measurements for a particular patient obtained, for example, from computed tomography images for the particular patient. In other examples, the internal frame 12 is based on average or expected anatomical measurements for a subset of patients. Further, the shape and/or size of different portions of the internal frame 12 can be modified from expected anatomical values to improve the simulated experience for practitioners. For example, as previously described, the funnel portion 16 that simulates the sacral hiatus can be enlarged so that it is easier for practitioners to insert the needle 112 into the channel 14 or sacral canal. Also, structures representative of certain anatomical landmarks can be enlarged or made to be more pronounced so that they can be more easily identified by the practitioner.

At step 312, a core 50 sized to fit within the internal frame 12 is made by a molding process. For example, the core 50 can be configured to fit within a recess in a 3D printed internal frame 12. In some examples, the core 50 is made by positioning the rod 52 in an elongated core mold 130, such as a mold that resembles an elongated trough formed from a metal sheet curved about a longitudinal axis of the core mold 130. An exemplary core mold 130 for forming the core 50 of the simulation device 10 is shown in FIG. 7A. After the rod 52 is positioned in the core mold 130, flowable polymer material, such as material that cures to form a thermoplastic elastomer (e.g., silicone, polypropylene, polyvinylchloride, polyethylene, polyvinylchloride, or synthetic or natural rubber (e.g., isoprene)) can be provided in the mold and allowed to harden or cure.

At step 314, after curing, the core 50 can be removed from the core mold 130 and inserted into a cavity of the internal frame 12. Also, other structures or components of the simulation device 10 can be added to the internal frame 12. For example, the tubing 24 and/or barrier 26 can be positioned in the channel 14. Further, the indicator 28 can be attached to the barrier 26. An example of a core 50 including features of the current claims is shown in FIG. 7B.

At step 316, the body 30 is then molded about the internal frame 12 and core 50, thereby forming a simulation device 10 with the internal frame 12 and core 50 encapsulated by the body 30. A body mold 132 used for forming the body 30 is shown in FIG. 7C. In order to form the body 30, the molded core 50, internal frame 12, and any other components of the simulation device 10, such as the flexible tube 24, barrier 26, or indicator 28, are positioned in the body mold 132, as shown in FIG. 7D. For example, the core 50 and/or internal frame 12 can be held in the body mold 132 using a jig or similar support structure. Once the core 50 and other components are in place, a flowable polymer precursor material is poured into the body mold 132. For example, the precursor can be a precursor for forming a thermoplastic elastomer (e.g., silicone, polypropylene, polyvinylchloride, polyethylene, polyvinylchloride, or synthetic or natural rubber (e.g., isoprene)). The material of the body 30 can be the same as the core material or can be a different thermoplastic elastomer material. The material within the body mold 132 is then allowed to harden or cure.

In some examples, the exterior skin 38 can be provided or formed in the mold prior to pouring the polymer precursor material for forming the body 30 in the mold. For example, sheets of a tough polymer material for forming the exterior skin 38 can be provided on surfaces of the body mold 132. The polymer precursor can then be introduced to the body mold 132 over the sheets. In other examples, a small amount of tougher uncured polymer material can be poured into the body mold 132 and allowed to cure to form the skin 38. After the skin 38 cures, the flowable polymer precursor for forming the body 30 can be poured into the body mold 132, as previously described.

At step 318, after curing the body 30, the molded body 30, internal frame 12, and core 50 enclosed within the body 30 are removed from the body mold 132. At step 320, any post-molding fabrication steps can be performed. For example, if not already in place, the molded body 30 can be coated with the exterior skin 38. Also, the molded body 30 can be cut or otherwise processed so that it more closely resembles a posterior portion of a pediatric patient. A finished simulation device 10, following molding, is shown in FIG. 7E.

At step 322, in some examples, after molding, the molded part including the body 30 can be inserted in another enclosure or object for shipping and/or to make the simulated procedure appear to be more realistic. For example, the molded body 30 can be provided in the carrying case 40. Alternatively or in other examples, the molded body 30 can be inserted into a caudal cavity 44 of a mannequin 42 or doll. Once these final packaging steps are completed, the simulation device 10 is ready to be provided to a medical facility for use in training practitioners in performing epidural procedures.

Non-limiting aspects or embodiments of the present invention will now be described in the following numbered clauses:

Clause 1: A simulation device for an epidural block procedure, the simulation device comprising: an elongated internal frame formed from an ultrasound opaque material defining an axially extending channel accessible through a widened funnel portion of the internal frame; a barrier positioned in the channel representative of anatomical structures that should not be contacted by an epidural needle; and a body formed from an ultrasound penetrable material molded about and at least partially enclosing the internal frame configured to be pierced by the epidural needle, the body comprising a top surface, a bottom surface, and peripheral surfaces extending between the top surface and the bottom surface, wherein the internal frame is positioned so that the epidural needle can be inserted through one of the surfaces of the body and into the channel through the funnel portion to simulate insertion of the epidural needle into an epidural space (e.g., a caudal epidural space) during the epidural block procedure and to provide identifiable tactile, auditory, and/or visual feedback for a practitioner when the epidural needle contacts the barrier.

Clause 2: The simulation device of clause 1, wherein the epidural block procedure comprises a needle and/or catheter placement for a caudal block epidural procedure.

Clause 3: The simulation device of clause 1 or clause 2, wherein the internal frame is configured to simulate a spine or spine portion of a mammalian patient.

Clause 4: The simulation device of clause 3, wherein the spine or spine portion comprises sacral, lumbar, and thoracic portions of the spine.

Clause 5: The simulation device of clause 3 or clause 4, wherein the spine or spine portion comprises: representations of a plurality of vertebrae connected together in series forming the elongated frame and the channel; and an elongated rod representative of a spinal cord of the mammalian patient.

Clause 6: The simulation device of any of clauses 3-5, wherein the funnel portion of the frame is representative of a sacral hiatus of the mammalian patient.

Clause 7: The simulation device of clause 6, wherein the funnel portion is enlarged in size and/or shape compared to a sacral hiatus of a standard mammalian patient to facilitate insertion of the epidural needle into the sacral hiatus.

Clause 8: The simulation device of clause 6 or clause 7, wherein the internal frame further comprises raised protrusions representative of sacral cornu positioned proximate to the funnel portion of the internal frame and, optionally, wherein the sacral cornu are enlarged to make palpation for identification of the sacral hiatus easier for the practitioner using the simulation device.

Clause 9: The simulation device of any of clauses 1-8, wherein the axially extending channel is representative of portions of a sacral canal and/or spinal canal of a mammalian patient and the barrier is representative of blood vessels and/or a dural sac disposed in the sacral canal.

Clause 10: The simulation device of any of clauses 1-9, wherein the internal frame is made by additive manufacturing (e.g., 3D printing) or injection molding.

Clause 11: The simulation device of any of clauses 1-10, wherein the body comprises a thermoplastic elastomer material comprising at least one of silicone, polypropylene, polyethylene, polyvinylchloride, or synthetic or natural rubber (e.g., isoprene), molded about the internal frame.

Clause 12: The simulation device of clause 11, wherein the thermoplastic elastomer material comprises plastisol.

Clause 13: The simulation device of any of clauses 1-12, wherein the body is formed from a material that simulates soft tissue, the material optionally comprising a transparent or opaque pierceable solid, gel, or liquid material.

Clause 14: The simulation device of clause 13, wherein the body is formed from a material that is compatible with ultrasound viewing of the internal frame and the barrier embedded in the body.

Clause 15: The simulation device of clause 13 or clause 14, wherein the body further comprises an exterior skin enclosing the material that simulates soft tissue, the exterior skin comprising a translucent or opaque material that is harder (e.g., has a durometer greater) than the material representative of the soft tissue.

Clause 16: The simulation device of any of clauses 1-15, wherein portions of the channel are filled with the ultrasound penetrable material of the body which provides resistance to insertion of the epidural needle through the body and the channel.

Clause 17: The simulation device of any of clauses 1-16, wherein the internal frame comprises at least one drainage opening in fluid communication with the channel for draining fluid from the channel.

Clause 18: The simulation device of clause 17, further comprising a container fluidly connected to the at least one drainage opening for collecting fluid injected into the elongated channel.

Clause 19: The simulation device of any of clauses 1-18, wherein the barrier comprises an electronic device electrically connected to an indicator, which causes the indicator to emit the feedback when the epidural needle contacts the barrier.

Clause 20: The simulation device of clause 19, wherein the indicator comprises at least one of a speaker, a buzzer, a light emitting diode, or a visual display.

Clause 21: The simulation device of clause 19 or clause 20, wherein the electronic device comprises at least one of an electrode configured to detect contact with a conductive material, such as the epidural needle, or a pressure sensor configured to detect pressure applied against the pressure sensor by the epidural needle.

Clause 22: The simulation device of any of clauses 1-21, wherein the barrier comprises a simulated, pierceable dural sac and/or a simulated pierceable blood vessel(s) comprising liquid that releases into the channel when the barrier is pierced by the epidural needle.

Clause 23: The simulation device of clause 22, wherein the simulated dural sac comprises an enclosure formed from a flexible elastomeric material with the liquid in an interior of the enclosure.

Clause 24: The simulation device of clause 22 or clause 23, wherein the liquid contained within the simulated dural sac is a first color and the liquid in the simulated blood vessel(s) is a different second color allowing the practitioner to distinguish between piercing the simulated dural sac and piercing the simulated blood vessel(s).

Clause 25: The simulation device of any of clauses 22-24, further comprising flexible tubing positioned in the channel for draining liquid released from the simulated dural sac or the simulated blood vessel(s) from the channel.

Clause 26: The simulation device of clause 25, further comprising a drainage container connected to a proximal end portion of the flexible tubing configured to receive the liquid drained from the channel.

Clause 27: The simulation device of any of clauses 1-26, further comprising a mannequin representative of a human or animal body comprising a caudal cavity sized to receive the body and the internal frame enclosed therein.

Clause 28: The simulation device of clause 27, wherein the mannequin resembles a pediatric patient, such as a neonate or infant.

Clause 29: The simulation device of any of clauses 1-28, further comprising a carrying case, with the body and the internal frame enclosed within the carrying case.

Clause 30: A training system allowing a practitioner to practice performing an epidural block procedure, the system comprising: the simulation device of any of clauses 1-29; and a needle comprising an electrode configured to contact the barrier of the simulation device to activate an indicator for providing the tactile, auditory, and/or visual feedback for the practitioner.

Clause 31: The system of clause 30, further comprising an ultrasound device comprising an ultrasound probe configured to contact surfaces of the body of the simulation device and a visual display for displaying obtained ultrasound images.

Clause 32: The system of clause 31, wherein the ultrasound probe comprises a hand-held scanner configured to slide over exterior skin of the body.

Clause 33: The system of clause 31 or clause 32, further comprising a controller electrically connected to the barrier of the simulation device and to the ultrasound device, wherein the controller is configured to receive information collected during a simulated procedure about contact between the epidural needle and the barrier.

Clause 34: The system of any of clauses 31-33, wherein the controller is configured to display information about the simulated procedure on the visual display of the ultrasound device, the information including a total duration or elapsed time of the simulation procedure, a number of times that the needle contacts the barrier, or an amount of pressure or force exerted on the barrier by the needle.

Clause 35: A method of training for an epidural block procedure, the method comprising: identifying an insertion location on one of the surfaces of the simulation device of any of clauses 1-29; inserting a distal tip of the epidural needle at the identified insertion location on the simulation device; and advancing a catheter over the inserted needle and through the channel to a lumbar or thoracic level represented on the internal frame of the simulation device.

Clause 36: The method of clause 35, wherein identifying the insertion location comprises palpating the surfaces of the simulation device to identify protrusions representative of the sacral cornua and of portions of the internal frame representative of the lumbar and thoracic levels of the spine.

Clause 37: The method of clause 36, further comprising positioning an ultrasound probe on surfaces of the simulation device to obtain ultrasound images of the funnel portion and channel of the internal frame.

Clause 38: The method of any of clauses 35-37, wherein inserting the distal tip of the epidural needle further comprises moving the distal tip of the epidural needle through the funnel portion and into the channel defined by the internal frame.

Clause 39: The method of clause 38, further comprising obtaining ultrasound images of the needle to confirm that the distal tip of the needle is in a portion of the channel representative of the epidural space.

Clause 40: The method of any of clauses 35-39, further comprising obtaining ultrasound images of a distal end of the catheter to confirm that the distal end of the catheter is at a desired lumbar or thoracic level of the spine.

Clause 41: The method of any of clauses 35-40, further comprising injecting a liquid into the channel of the simulation device through the catheter and confirming that the liquid is at a desired position in the channel in ultrasound images.

Clause 42: A fabrication method for a simulation device for an epidural block procedure, the method comprising: forming a molded core of a simulation device by a molding process in which flowable polymer material is poured into a core mold containing an elongated rod representative of a spinal cord of a mammalian patient, wherein the molded core encloses the rod and defines spaces representative of an epidural space (e.g., a caudal epidural space) in a sacral canal of the mammalian patient; positioning the molded core within a channel of an internal frame of the simulation device, which is representative of a spine of the mammalian patient; and forming a molded body about the molded core and the internal frame by positioning the molded core and the internal frame within a body mold and pouring a flowable polymer material into the body mold to form the simulation device.

Clause 43: The fabrication method of clause 42, wherein the internal frame comprises an anatomical model of the spine generated from anatomical measurements from one or more patients.

Clause 44: The fabrication method of clause 43, wherein the internal frame is made by additive manufacturing (e.g., 3D printing).

Clause 45: The fabrication method of any of clauses 42-44, wherein the flowable polymer material poured into the core mold and/or the body mold comprises a polymer precursor that cures to form at least one of silicone, polypropylene, polyethylene, polyvinylchloride, or synthetic or natural rubber (e.g., isoprene).

Clause 46: The method of any of clauses 42-45, wherein the body mold comprises surfaces representative of surfaces of a posterior portion of the patient.

Clause 47: The method of any of clauses 42-46, further comprising providing layers of exterior skin in the body mold prior to pouring the flowable polymer material into the body mold.

Clause 48: The method of any of clauses 42-47, further comprising positioning the molded body in a caudal cavity of a mannequin to form the simulation device.

The invention claimed is:

1. A simulation device for an epidural block procedure, the simulation device comprising:

an elongated internal frame formed from an ultrasound opaque material defining an axially extending channel accessible through a widened funnel portion of the internal frame;

a barrier positioned in the channel representative of anatomical structures that should not be contacted by an epidural needle; and a body formed from an ultrasound penetrable material molded about and at least partially enclosing the internal frame configured to be pierced by the epidural needle, the body comprising a top surface, a bottom surface, and peripheral surfaces extending between the top surface and the bottom surface, wherein the internal frame is positioned so that the epidural needle can be inserted through one of the surfaces of the body and into the channel through the funnel portion to simulate insertion of the epidural needle into an epidural space during the epidural block procedure and to provide identifiable tactile, auditory, and/or visual feedback for a practitioner when the epidural needle contacts the barrier.

2. The simulation device of claim 1, wherein the epidural block procedure comprises a needle and/or catheter placement for a caudal block epidural procedure.

3. The simulation device of claim 1, wherein the internal frame is configured to simulate a spine or spine portion of a mammalian patient, and wherein the spine or spine portion comprises: representations of a plurality of vertebrae connected together in series forming the elongated frame and the channel; and an elongated rod representative of a spinal cord of the mammalian patient.

4. The simulation device of claim 1, wherein the axially extending channel is representative of portions of a sacral canal and/or spinal canal of a mammalian patient and the barrier is representative of blood vessels and/or a dural sac disposed in the sacral canal.

5. The simulation device of claim 1, wherein the body is formed from a material that is compatible with ultrasound viewing of the internal frame and the barrier embedded in the body.

6. The simulation device of claim 1, wherein portions of the channel are filled with the ultrasound penetrable material of the body which provides resistance to insertion of the epidural needle through the body and the channel.

7. The simulation device of claim 1, wherein the internal frame comprises at least one drainage opening in fluid communication with the channel for draining fluid from the channel.

8. The simulation device of claim 7, further comprising a container fluidly connected to the at least one drainage opening for collecting fluid injected into the elongated channel.

9. The simulation device of claim 1, wherein the barrier comprises an electronic device electrically connected to an indicator, which causes the indicator to emit the feedback when the epidural needle contacts the barrier.

10. The simulation device of claim 9, wherein the electronic device comprises at least one of an electrode configured to detect contact with a conductive material, such as the epidural needle, or a pressure sensor configured to detect pressure applied against the pressure sensor by the epidural needle.

11. The simulation device of claim 1, wherein the barrier comprises a simulated, pierceable dural sac and/or a simulated pierceable blood vessel(s) comprising liquid that releases into the channel when the barrier is pierced by the epidural needle.

12. The simulation device of claim 11, wherein the simulated dural sac comprises an enclosure formed from a flexible elastomeric material with the liquid in an interior of the enclosure.

13. The simulation device of claim 11, wherein the liquid contained within the simulated dural sac is a first color and the liquid in the simulated blood vessel(s) is a different second color allowing the practitioner to distinguish between piercing the simulated dural sac and piercing the simulated blood vessel(s).

14. The simulation device of claim 11, further comprising flexible tubing positioned in the channel for draining liquid released from the simulated dural sac or the simulated blood vessel(s) from the channel.

15. The simulation device of claim 14, further comprising a drainage container connected to a proximal end portion of the flexible tubing configured to receive the liquid drained from the channel.

16. The simulation device of claim 1, further comprising a mannequin representative of a human or animal body comprising a caudal cavity sized to receive the body and the internal frame enclosed therein, wherein the mannequin resembles a pediatric patient, such as a neonate or infant.

17. A training system allowing a practitioner to practice performing an epidural block procedure, the system comprising:

the simulation device of claim 1; and a needle comprising an electrode configured to contact the barrier of the simulation device to activate an indicator for providing the tactile, auditory, and/or visual feedback for the practitioner.

18. The system of claim 17, further comprising:

an ultrasound device comprising an ultrasound probe configured to contact surfaces of the body of the simulation device and a visual display for displaying obtained ultrasound images; and a controller electrically connected to the barrier of the simulation device and to the ultrasound device, wherein the controller is configured to receive Information collected during a simulated procedure about contact between the epidural needle and the barrier and display the received information on the visual display of the ultrasound device, the information including a total duration or elapsed time of the simulation procedure, a number of times that the needle contacts the barrier, or an amount of pressure of force exerted on the barrier by the needle.

19. A method of training for an epidural block procedure, the method comprising:

identifying an insertion location on one of the surfaces of the simulation device of claim 1;

inserting a distal tip of the epidural needle at the identified insertion location on the simulation device; and advancing a catheter over the inserted needle and through the channel to a lumbar or thoracic level represented on the internal frame of the simulation device.

* * * * *